Patented July 10, 1951

2,559,854

UNITED STATES PATENT OFFICE 2,559,854

ACRYLIC ACID ESTERS CONTAINING A DIALKYLPHOSPHONO GROUP AND POLYMERS PREPARED THEREFROM

Joseph B. Dickey and Harry W. Coover, Rochester, N. Y., assignors to Eastman Kodak Company, Rochester, N. Y., a corporation of New Jersey No Drawing. Application October 6, 1948,
Serial No. 53,135

12 Claims. (Cl. 260—89.3)

This invention relates to new acrylic compounds containing phosphorus and to polymers prepared therefrom. More particularly this invention relates to new esters of acrylic acid containing a dialkylphosphono group substituted in the α- or β-position, and to polymers of such compounds.

Alkyl esters of propene-2-phosphonic acid have previously been described (Hamilton U. S. Patent No. 2,365,466, dated December 19, 1944), as have the polymers of such esters (Lindsey U. S. Patent No. 2,439,214, dated April 6, 1948). Esters of butadienylphosphonic acid and polymers of such esters have also been described (Kosolapoff U. S. Patent No. 2,389,576, dated November 20, 1945). We have now prepared a new class of phosphorus compounds comprising acrylic acid esters containing a dialkylphosphono group substituted in the α- or β-position. We have further found that polymers of these new phosphorus compounds can be prepared which can be used in the preparation of sheets, films, molded objects, etc.

It is, therefore, an object of our invention to provide new phosphorus compounds. Another object is to provide new esters of acrylic acid containing a dialkylphosphono group substituted in the α- or β-position. Still another object is to provide methods for preparing these new esters. Another object is to provide polymers of these new esters. Still another object is to provide sheets, films, molded objects, etc. from the polymers of these esters which are resistant to flames. Other objects will become apparent from a consideration of the following description and examples.

According to our invention we prepare our new esters of acrylic acid containing a dialkylphosphono group in the α-position by reacting an ester of a β-acyloxy-α-halogenopropionic acid with a trialkyl phosphite or an alkali metal salt of a dialkyl acid phosphite, followed by pyrolysis of the β-acyloxy-α-dialkylphosphonopropionic acid ester formed to an α-dialkylphosphonoacrylic acid ester.

The new esters of acrylic acid containing a dialkylphosphono group substituted in the β-position of our invention can advantageously be prepared by reacting an ester of an α-halogenoacrylic acid with a trialkyl phosphite or an alkali metal salt of a dialkyl acid phosphite.

As trialkyl phosphites we can use trimethyl phosphite, triethyl phosphite, tri-n-propyl phosphite, triisopropyl phosphite, tri-n-butyl phosphite, triisobutyl phosphite, etc. (e. g. a trialkyl phosphite wherein each of the alkyl groups contains from 1 to 4 carbon atoms).

As alkali metal salts of dialkyl acid phosphites, we can use the sodium, potassium, lithium, etc. salts of dimethyl hydrogen phosphite, diethyl hydrogen phosphite, di-n-propyl hydrogen phosphite, diisopropyl hydrogen phosphite, di-n-butyl hydrogen phosphite, diisobutyl hydrogen phosphite, etc. (e. g. salts of the metals of group I of the periodic system of dialkyl and phosphites containing from 1 to 4 carbon atoms in each of the alkyl groups). Alkali metal salts of mixed dialkyl acid phosphites (i. e. alkali metal salts of dialkyl acid phosphites wherein the alkyl groups are different), e. g. ethyl methyl hydrogen phosphite, etc. can also be advantageously utilized in our invention.

As β-acyloxy-α-halogenopropionic acid esters from which our α-dialkylphosphonoacrylic acid ester can be prepared, the esters represented by the following general formula:

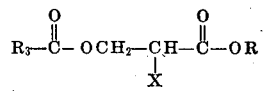

wherein R represents an alkyl group, e. g. methyl, ethyl, n-propyl, isopropyl, n-butyl, isobutyl, etc. groups (e. g. an alkyl group of the formula $C_nH_{2n+1}$ wherein $n$ is a positive integer from 1 to 4), $R_3$ represents an alkyl group, e. g. methyl, ethyl, n-propyl, isopropyl, etc. groups (e. g. an alkyl group of the formula $C_nH_{2n+1}$ wherein $n$ is a positive integer from 1 to 3) and X represents a halogen atom, e. g. a chlorine atom, a bromine atom, etc. The ester wherein R and $R_3$ in the above formula each represents a methyl group and X represents a chlorine atom, i. e. the compound represented by the formula:

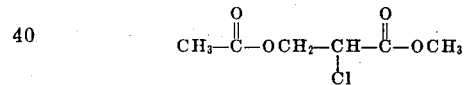

has been found to be especially useful. One method for preparing these β-acyloxy-α-halogenopropionic acid esters is disclosed in the copending application of Delbert D. Reynolds and William O. Kenyon, Ser. No. 22,504, filed April 21, 1948, now Patent No. 2,514,672 issued July 11, 1950. Another method for preparing these β-acyloxy-α-halogenopropionic acid esters comprises reacting a carboxylic acid anhydride with an ester of an α-halogeno-β-hydroxypropionic acid, as more fully described hereinafter.

As α-halogenoacrylic acid esters, from which the β-dialkylphosphonoacrylic acid esters of our invention can be prepared, we can advantageously use the esters represented by the following general formula:

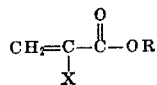

wherein R and X have the values set forth above. Typical esters include methyl α-chloroacrylate, methyl α-bromoacrylate, ethyl α-chloroacrylate, ethyl α-bromoacrylate, n-propyl, α-chloroacrylate, isopropyl α-chloroacrylate, n-butyl α-chloroacrylate, isobutyl α-chloroacrylate, etc.

The preparation of our new β-dialkylphosphonoacrylic esters by reacting an α-halogenoacrylic ester with an alkali metal salt of a dialkyl acid phosphite can be illustrated by the following equation:

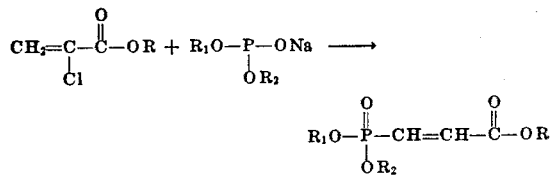

wherein R, R₁ and R₂ have the values set forth above. A similar reaction takes place where a trialkyl phosphite is employed instead of the alkali metal salt of a dialkyl acid phosphite. It will be noted that a β-substituted ester is obtained from an α-substituted ester in carrying out our new process.

The following examples will illustrate further the manner whereby we practice our invention.

*Example 1.—Methyl β - diethylphosphonoacrylate(diethyl β - carbomethoxyvinylphosphonate)*

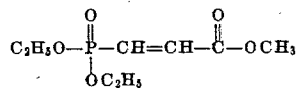

16.6 g. of triethyl phosphite were slowly added to 16.5 g. of methyl α-bromoacrylate in a Claisen flask which was equipped for distillation. The reaction mixture was then heated at such a rate that ethyl bromide (B. P. 39° C.) slowly distilled from the flask. After the theoretical yield of ethyl bromide had been collected, the residue was fractionated. Methyl β - diethylphosphonoacrylate was obtained as a distillate boiling at 99°–100° C./1 mm.

When a molecularly equivalent amount of triisopropyl phosphite replaced the triethyl phosphite in the above example, methyl β-diisopropylphosphonoacrylate represented by the formula:

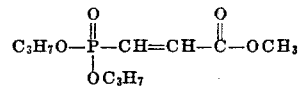

can be obtained.

*Example 2.—Methyl α-diethylphosphonoacrylate (diethyl α-carbomethoxyvinylphosphonate)*

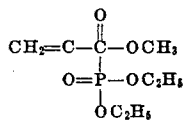

18.0 g. of methyl β-acetoxy-α-chloropropionate were placed in a Claisen flask equipped for distillation and 10.0 g. of triethyl phosphite were added. The reaction mixture was then warmed at such a rate that ethyl chloride (B. P. 13° C.) slowly distilled over. The residue was fractionally distilled, and methyl β-acetoxy-α-diethylphosphonopropionate represented by the formula:

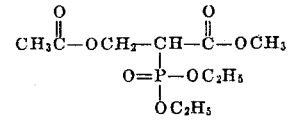

was collected as a distillate boiling at 100°–120° C./1 mm.

64.0 g. of the methyl β-acetoxy-α-diethylphosphonopropionate prepared above were passed into a pyrolysis tube heated at 230°–250° C. The crude product passing from the pyrolysis tube was condensed and then distilled in a fractionating column. Methyl α-diethylphosphonoacrylate was obtained as a distillate boiling at 115°–118° C./3 mm.

The methyl β-acetoxy-α-chloropropionate used in the above example was prepared as follows:

13.9 g. of methyl α-chloro-β-hydroxypropionate were placed in a glass bottle immersed in an ice bath. 12.0 g. of acetic anhydride were then slowly added and after the addition was complete, the reaction mixture was heated on a steam bath for one hour. It was then fractionally distilled to give 13.5 g. of methyl β-acetoxy-α-chloropropionate boiling at 70°–73° C./21 mm.

Methyl β-n-butyroxy-α-chloropropionate can be prepared by replacing the acetic anhydride in the above example with a molecularly equivalent amount of n-butyric anhydride. Similarly n-butyl β-acetoxy-α-chloropropionate can be prepared by replacing the methyl β-acetoxy-α-chloropropionate in the above example with a molecularly equivalent amount of n-butyl α-chloro-β-hydroxypropionate.

When a molecularly equivalent amount of tri-n-butyl phosphite replaces the triethyl phosphite in the above example, methyl α-di-n-butylphosphonoacrylate represented by the formula:

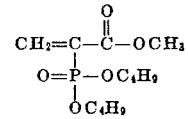

can be obtained.

The β - acyloxy - α - dialkylphosphonopropionic acid esters of our invention can be pyrolyzed at temperatures lower (e. g. 175° C.) or higher (e. g. 350° C.) than those used in the above example. The pyrolysis tube can be empty or can contain a packing material, e. g. quartz chips, silica pellets, etc. Suitable apparatus for carrying out a typical pyrolysis is described by Smith et al., "Ind. Eng. Chem.," vol. 34 (1942), p. 473. From about 1 to 3 moles of the ester can be pyrolyzed per hour, depending on the temperature, size of apparatus, etc. used. Other apparatus useful in pyrolyzing the β-acyloxy-α-dialkylphosphonopropionic acid esters of our invention are described in Ratchford et al. U. S. Patent No. 2,408,177 and Fein et al. U. S. Patent No. 2,414,589.

*Example 3.—Methyl β - ethylmethylphosphono - acrylate (ethyl methyl β-carbomethoxyvinylphosphonate)*

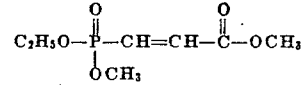

2.3 g. of metallic sodium were placed in a three-necked, round-bottom flask which was equipped with a sealed stirrer, a dropping funnel and a reflux condenser closed at the top with a calcium chloride tube, and 30 cc. of dry toluene were added. While the reaction mixture was gently warmed, 12.4 g. of ethyl methyl hydrogen phosphite were added dropwise. Heating and stirring were continued until all of the sodium had completely reacted.

The reaction mixture was then cooled in an ice bath, and 16.5 g. of methyl α-bromoacrylate were added dropwise while the temperature was kept below 15° C. by cooling whenever necessary. When the addition was completed, the reaction mixture was refluxed gently with stirring for six hours. The reaction mixture was then cooled and washed thoroughly with water. The upper, organic layer was fractionally distilled, and methyl β-ethylmethylphosphonoacrylate boiling at 90°–92° C./1 mm. was obtained.

The ethyl methyl hydrogen phosphite used in the above example was prepared as follows:

133 g. of the dichloride of monomethyl dihydrogen phosphite (dichloromethylphosphine) were dissolved in 300 cc. of diethyl ether and the solution was placed in a three-necked, round-bottom flask equipped with a stirrer, an inlet tube for air, and a condenser. While slowly adding 100 g. of anhydrous ethanol, the reaction mixture was cooled in an ice bath and air was bubbled through to remove as much hydrogen chloride as possible. After 30 minutes dry ammonia was passed into the reaction mixture, and the ammonium chloride which precipitated was removed by filtration. More ammonia gas was passed through the filtrate to insure that all of the hydrogen chloride had been removed. The filtrate was then distilled to give 95 g. of ethyl methyl hydrogen phosphite boiling at 67° C./8 mm.

In a manner similar to that illustrated above, other mixed dialkyl hydrogen phosphites can be prepared. For example, by substituting other dichlorides of monoalkyl dihydrogen phosphites (e. g. the dichloride of monoethyl dihydrogen phosphite) for the dichloride of monomethyl dihydrogen phosphite. or other anhydrous alcohols for the anhydrous methanol (e. g. isobutanol) in molecularly equivalent amounts, used above, other mixed dialkyl hydrogen phosphites (e. g. ethyl isobutyl hydrogen phosphite) can be readily prepared.

*Example 4.—Methyl β-di-n-butylphosphonoacrylate (di-n-butyl-β-carbomethoxyvinylphosphonate)*

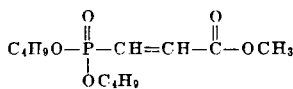

2.3 g. of metallic sodium were placed in a three-necked, round-bottom flask, which was equipped with a sealed stirrer, dropping funnel, and a reflux condenser closed at the top with a calcium chloride tube, and 30 cc. of dry toluene were added. While the toluene was gently refluxed, 19.4 g. of di-n-butyl hydrogen phosphite were added dropwise. Refluxing and stirring were continued until all of the sodium had completely reacted.

The reaction mixture was then cooled, and 16.5 g. of methyl α-bromoacrylate were added dropwise while the temperature was kept below 15° C. by cooling when necessary. After the addition was complete, the reaction mixture was refluxed gently with stirring for six hours. The reaction mixture was then cooled and washed thoroughly with water. The upper, organic layer was then fractionally distilled, and after removal of toluene, methyl β-di-n-butylphosphonoacrylate boiling at 130°–133° C./1 mm. was obtained.

When a molecularly equivalent amount of isopropyl α-chloroacrylate replaces the methyl α-bromoacrylate in the above example, isopropyl β-di-n-butylphosphonoacrylate represented by the formula:

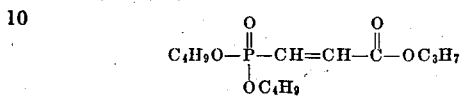

can be obtained.

*Example 5.—Ethyl β-dimethylphosphonoacrylate (dimethyl β-carbethoxyvinylphosphonate)*

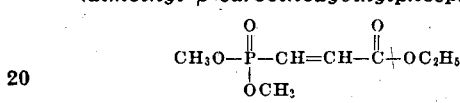

12.5 g. of trimethyl phosphite were slowly added to 17.9 g. of ethyl α-bromoacrylate in a Claisen flask equipped for distillation. The reaction mixture was then warmed at such a rate that methyl bromide (B. P. 5° C.) was slowly evolved from the flask. After the theoretical yield of methyl bromide had been collected, the residue was fractionally distilled. Ethyl α-dimethylphosphonoacrylate was obtained as a distillate boiling at 80°–81° C./1 mm.

When a molecularly equivalent amount of isobutyl α-chloroacrylate replaces the ethyl α-bromoacrylate in the above example, isobutyl β-dimethylphosphonoacrylate represented by the formula:

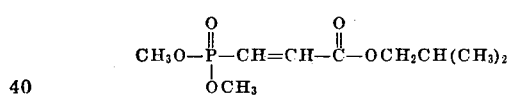

can be obtained.

*Example 6.—n-Butyl - β - diethylphosphonoacrylate (diethyl β-carbo-n-butoxyvinylphosphonate)*

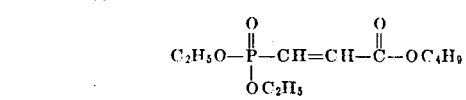

16.6 g. of triethyl phosphite were slowly added to 21.1 g. of n-butyl α-bromoacrylate in a Claisen flask equipped for distillation. The reaction mixture was then heated at such a rate that ethyl bromide (B. P. 39° C.) was slowly distilled from the flask. After the theoretical yield of ethyl bromide had been collected, the residue was fractionally distilled. n-Butyl β-diethylphosphonoacrylate was obtained as the distillate.

In a similar manner, other alkyl esters of α- or β-dialkylphosphonoacrylic acids can be obtained by replacing the trialkyl phosphites, alkali metal salts of the dialkyl acid phosphites, alkyl α-halogenoacrylates, or β-acyloxy-α-halogenopropionic acid esters shown with other compounds selected from those set forth above. The alkyl esters of α- or β-dialkylphosphonoacrylic acids of our invention can advantageously be represented by the following two general formulas:

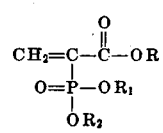

and

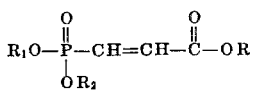

wherein R has the value set forth above, and $R_1$ and $R_2$ each represents an alkyl group, e. g. methyl, ethyl, n-propyl, isopropyl, n-butyl, isobutyl, etc. groups (e. g. an alkyl group of the formula $C_nH_{2n+1}$ wherein $n$ is a positive integer from 1 to 4. Other alkyl esters of α- or β-dialkylphosphonoacrylic acids coming within the scope of our invention include, for example, those represented by the following formulas:

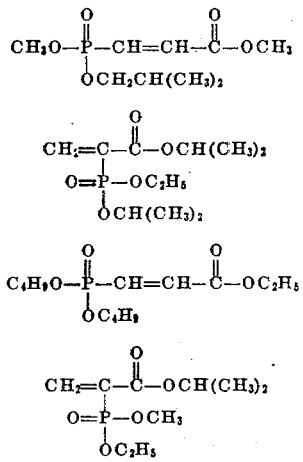

etc.

The alkyl esters of α- or β-dialkylphosphonoacrylic acids of this invention can be either homopolymerized or interpolymerized with another copolymerizable unsaturated compound by any of the known methods employed in the art. The molecular weight of the polymers will depend somewhat on the method and conditions employed in the polymerization. Thus, the molecular weight of the polymers can be low and correspond to a product of only 3 or 4 monomer units, or it can be higher and correspond to a product of 500, or more, monomer units. Polymers can be prepared, for example, by heating our new alkyl esters, in the presence of another copolymerizable, unsaturated compound, in the presence of substances which are known to initiate the polymerization of vinyl-type compounds. Typical catalysts include gaseous oxygen (for the more difficultly polymerizable compounds), the organic peroxides, such as benzoyl peroxide, acetyl peroxide, acetyl benzoyl peroxide, lauroyl peroxide, oleoyl peroxide, etc., the persulfates, such as the alkali persulfates (e. g. sodium, potassium, etc. persulfates) or ammonium persulfate, hydrogen peroxide, etc. Actinic or ultraviolet light can be used alone or to supplement the above catalysts or initiators. Certain so-called "accelerators," such as sodium bisulfite, etc., or "chain regulators," such as dodecyl mercaptan, diisopropyl dixanthogen, etc. can be used in conjunction with the usual polymerization catalysts or initiators, if desired.

The polymerization can also be carried out by the bead or emulsion method, in which water or some other medium in which the monomers are substantially insoluble, is used with or without the aid of dispersing agents, the polymer thus precipitating as it is formed. Our polymerization can also be carried out in the presence of an organic solvent for the monomers, but in which the polymers are substantially insoluble. Solvents can be used, however, which dissolve the polymer where this is desired, the polymer being obtained by pouring the polymerization solution into a solvent such as methanol, ethanol, acetic acid, etc., in which the polymer is not soluble.

The quantity of polymerization catalyst used can be varied and is generally a function of the unsaturated compounds being polymerized. Generally from 0.01 per cent to 2.0 per cent by weight, based on the total weight of polymerizable compounds present, is adequate. Larger amounts can be used, if desired, although there is ordinarily no advantage in doing so. Usually increasing the quantity of polymerization catalyst or initiator causes a lowering of the molecular weight of the resulting polymer.

The polymerization can be carried out at or near room temperature, or at temperatures above the normal boiling points of the compounds being polymerized. In the polymerization of normally gaseous olefinic compounds with our new alkyl esters of α- or β-dialkylphosphonoacrylic acids, the normally gaseous olefinic compound can be introduced in gaseous or liquid form into the cooled reaction vessel containing our new alkyl esters of α- or β-dialkylphosphonoacrylic acids (which are advantageously dispersed in an aqueous medium containing a dispersing agent and a polymerization initiator), and the reaction vessel then sealed and removed from the cooling medium. The polymerization can then be allowed to proceed at room temperature or can be subjected to elevated temperatures.

The polymerizations can be carried out at atmospheric pressure, or at pressures above atmospheric pressure.

The following examples will serve to illustrate the manner whereby polymers can be obtained from our new alkyl esters of α- or β-dialkylphosphonoacrylic acids.

*Example 7.—Copolymer of styrene and methyl α-diethylphosphonoacrylate*

8.0 g. of styrene, 2.0 g. of methyl α-diethylphosphonoacrylate prepared as described in Example 2 above and 0.1 g. of acetyl peroxide were placed in a glass bottle. The air in the bottle was displaced by nitrogen gas, and the reaction mixture was then heated at 60° C. until it had set to a clear, hard polymer. The polymer was flame resistant and was useful for shaping into molded objects.

*Example 8.—Copolymer of styrene and methyl β-diethylphosphonoacrylate*

8.0 g. of styrene, 2.0 g. of methyl β-diethylphosphonoacrylate prepared as described in Example 1 above, and 0.1 g. of acetyl peroxide were placed in a glass bottle. After the air in the bottle had been replaced with nitrogen gas, the reaction mixture was heated at 60° C. on a constant temperature bath until it had set to a clear, hard mass. The resulting polymer was flame resistant and was found to be useful for shaping into molded objects.

When a molecularly equivalent amount of methyl α-methylacrylate replaced the styrene in the above example, a polymer exhibiting similar flame resisting properties can be obtained.

*Example 9.—Copolymer of acrylonitrile and methyl β-diethylphosphonoacrylate*

8.0 g. of freshly distilled acrylonitrile, 2.0 g. methyl β-diethylphosphonoacrylate prepared as described in Example 1 above, 1 cc. of a 10 per cent aqueous solution of hydrogen peroxide and 1 cc. of 6 N sulfuric acid were added to 90 cc. of distilled water containing 0.02 g. of FeSO₄.7H₂O dissolved therein. The polymerization started almost immediately as evidenced by the formation of a fine, powdery precipitate, and was complete at the end of 4–5 hours. The reaction mixture was filtered, and the filter cake was washed free of acid and iron with distilled water, and then dried. The resulting polymer was white in color and was found to be useful in the preparation of white, lustrous fibers when dissolved in a suitable solvent, e. g. N,N-dimethylformamide to give a 10 to 20 per cent, by weight, solution of the polymer, and the solution was spun into a coagulating bath and the fibers then drafted from 200–500 per cent in hot air or oil.

Similarly, a polymer useful in the preparation of fibers can be obtained by substituting a molecularly equivalent amount of the methyl β-ethylmethylphosphonoacrylate prepared according to the process of Example 3 in the above example.

*Example 10.—Copolymer of methyl vinyl ketone and ethyl β-dimethylphosphonoacrylate*

10 g. of methyl vinyl ketone and 5 g. of ethyl β-dimethylphosphonoacrylate prepared according to the process described in Example 5 above were added to 50 cc. of water having dissolved therein 0.5 g. of polyvinyl alcohol and 0.2 g. of ammonium persulfate. The resulting emulsion was heated at 60°–70° C. for 24 hours, and acetic acid was then added. The white product was then filtered, washed free of acid with distilled water, and dried. It was found to be useful for shaping into molded objects.

When molecularly equivalent amounts of isopropenyl methyl ketone or phenyl vinyl ketone replace the methyl vinyl ketone used in the above example, other polymers useful in the preparation of molded objects can be prepared.

*Example 11.—Copolymer of ethylene and n-butyl β-diethylphosphonoacrylate*

10 g. of n-butyl β-diethylphosphonoacrylate prepared as described in Example 6 above were placed in a silver-lined, steel autoclave to which 0.2 g. of benzoyl peroxide and 40 g. of n-hexane had been added. Ethylene was then pumped in until the pressure in the autoclave rose to 600 atmospheres. Agitation of the reaction mixture was started, and the autoclave was heated at 125° C. for 10 hours. The reaction mixture was cooled, the charge removed, and the solid residue which had formed was subjected to steam distillation and then filtered. The resulting polymer was a tough solid which could be shaped into molded objects.

By replacing ethylene in the above example by a molecularly equivalent amount of propylene, a polymer which is also useful in the preparation of molded objects can be obtained.

*Example 12.—Copolymer of vinyl chloride and methyl β-diethylphosphonoacrylate*

5 g. of methyl β-diethylphosphonoacrylate, 2 g. of soap, 0.1 g. of ammonium persulfate and 0.2 g. ammonium bisulfite were dispersed in 100 cc. of water in a pressure bottle. The bottle was closed and vinyl chloride was passed in until a total of 10 g. had been added. After heating the bottle for 24 hours at 60° C., acetic acid was added, and the white product which separated was filtered off, washed free of acid with distilled water, and then dried. The polymer so obtained was found to be useful in the manufacture of molded objects.

When a molecularly equivalent amount of vinylidene chloride replaces the vinyl chloride in the above example, a polymer which is also useful in the preparation of molded objects can be obtained.

*Example 13.—Interpolymer of butadiene, vinylidene chloride and methyl β-diethylphosphonoacrylate*

1 g. of vinylidene chloride, 5 g. of methyl β-diethylphosphonoacrylate, prepared as described in Example 1, 0.5 g. of a 10 per cent solution of hydrogen peroxide, 0.1 g. of diisopropyl dixanthogen and 0.02 g. of FeSO₄.7H₂O were dispersed in 40 g. of a 1.5 per cent aqueous solution of sodium oleate in a pressure bottle. 10.0 g. of 1,3-butadiene were passed in and the bottle was closed. After standing at room temperature for 24 hours, the polymerization was complete. The resulting polymer was obtained in the form of a latex-like dispersion which resembled natural rubber latex.

Operating in a manner similar to that illustrated in the above examples, other copolymerizable vinyl-type compounds can be interpolymerized with our new alkyl esters of α- or β-dialkyl-phosphonoacrylic acids. Typical vinyl-type compounds include vinyl acetate, vinyl propionate, vinyl chloride, vinylidene chloride, acrylic acid, α-methylacrylic acid, methyl acrylate, methyl α-methylacrylate, ethyl acrylate, ethyl α-methylacrylate, n-propyl acrylate, n-propyl α-methylacrylate, isopropylacrylate, isopropyl α-methylacrylate, n-butylacrylate, n-butyl α-methylacrylate, isobutylacrylate, isobutyl α-methacrylate, styrene, ethylene, propylene, isobutylene, acrylonitrile, α-methylacrylonitrile, acrylamide, α-methylacrylamide, etc. The amount of our new alkyl esters of α- or β-dialkyl-phosphonoacrylic acids present in the polymerization mixture prior to polymerization generally can vary from about 5 to 100 per cent by weight, based on the total weight of the unsaturated polymerizable compounds present. Smaller amounts can be used, although there is ordinarily no advantage in doing so. We have found that mixtures containing from about 10 to 50 per cent by weight of our new alkyl esters of α- or β-dialkylphosphonoacrylic acids provide especially useful polymers.

The new polymers of this invention are especially useful in the preparation of products which must be resistant to flames. Some of the polymers of our invention have been found to be non-inflammable, a property which is noticeably lacking in most synthetic polymers. Many of the polymers of this invention can be extruded into fibers when dissolved in a suitable solvent, e. g. N,N-dimethylformamide or N,N-dimethylacetamide. They can also be cast into sheets or films, or shaped into molded objects. Many are also useful in coating metals, fabrics, leather, etc.

What we claim as our invention and desire secured by Letters Patent of the United States is:

1. A compound selected from the group consisting of those represented by the following two general formulas:

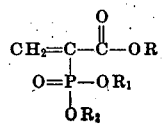

and

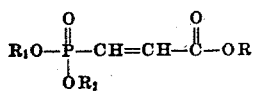

wherein R, R₁ and R₂ each represents an alkyl group of the formula $C_nH_{2n+1}$ wherein $n$ is a positive integer from 1 to 4.

2. A compound selected from those represented by the following general formula:

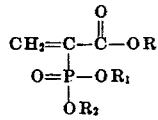

wherein R, R₁ and R₂ each represents an alkyl group of the formula $C_nH_{2n+1}$ wherein $n$ is a positive integer from 1 to 4.

3. A compound selected from those represented by the following general formula:

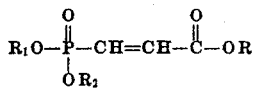

wherein R, R₁ and R₂ each represents an alkyl group of the formula $C_nH_{2n+1}$ wherein $n$ is a positive integer from 1 to 4.

4. The compound represented by the following formula:

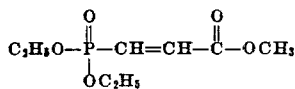

5. The compound represented by the following formula:

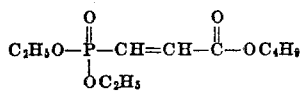

6. The compound represented by the following formula:

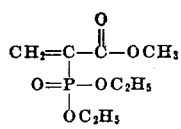

7. A process for preparing an acrylic acid ester represented by the following general formula:

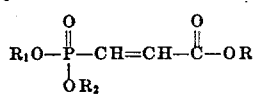

wherein R, R₁ and R₂ each represents an alkyl group of the formula $C_nH_{2n+1}$ wherein $n$ is a positive integer from 1 to 4, comprising reacting an ester represented by the formula:

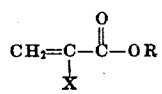

wherein R represents an alkyl group of the formula $C_nH_{2n+1}$ wherein $n$ is a positive integer from 1 to 4 and X represents a halogen atom with an alkali metal salt of a dialkyl acid phosphite represented by the formula:

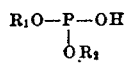

wherein R₁ and R₂ each represents an alkyl group of the formula $C_nH_{2n+1}$ wherein $n$ is a positive integer from 1 to 4.

8. A polymer of a compound selected from the group consisting of those represented by the following two general formulas:

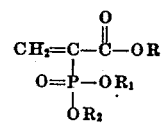

and

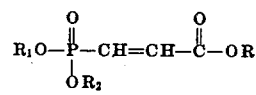

wherein R, R₁ and R₂ each represents an alkyl group of the formula $C_nH_{2n+1}$ wherein $n$ is a positive integer from 1 to 4.

9. A polymer of a compound selected from those represented by the following general formula:

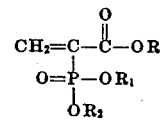

wherein R, R₁ and R₂ each represents an alkyl group of the formula $C_nH_{2n+1}$ wherein $n$ is a positive integer from 1 to 4.

10. A polymer of a compound selected from those represented by the following general formula:

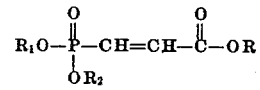

wherein R, R₁ and R₂ each represents an alkyl group of the formula $C_nH_{2n+1}$ wherein $n$ is a positive integer from 1 to 4.

11. A process for preparing an acrylic acid ester represented by the following general formula:

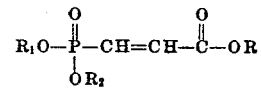

wherein R, R₁ and R₂ each represents an alkyl group of the formula $C_nH_{2n+1}$ wherein $n$ is a positive integer from 1 to 4, comprising reacting an ester represented by the formula:

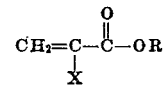

wherein R represents an alkyl group of the formula $C_nH_{2n+1}$ wherein $n$ is a positive integer from 1 to 4 and X represents a halogen atom with a compound selected from the group consisting of an alkali metal salt of a dialkyl acid phosphite represented by the formula:

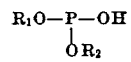

wherein R₁ and R₂ each represents an alkyl group of the formula $C_nH_{2n+1}$ wherein $n$ is a positive integer from 1 to 4, and a trialkyl phosphite wherein each of the alkyl groups contains from 1 to 4 carbon atoms.

12. A process for preparing an acrylic acid ester represented by the following general formula:

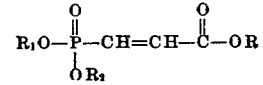

wherein R, $R_1$ and $R_2$ each represents an alkyl group of the formula $C_nH_{2n+1}$ wherein $n$ is a positive integer from 1 to 4, comprising reacting an ester represented by the formula:

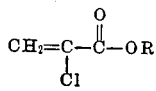

wherein R represents an alkyl group of the formula $C_nH_{2n+1}$ wherein $n$ is a positive integer from 1 to 4 with an alkali metal salt of a dialkyl acid phosphite represented by the formula:

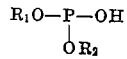

wherein $R_1$ and $R_2$ each represents an alkyl group of the formula $C_nH_{2n+1}$ wherein $n$ is a positive integer from 1 to 4.

JOSEPH B. DICKEY.
HARRY W. COOVER.

REFERENCES CITED

The following references are of record in the file of this patent:

UNITED STATES PATENTS

| Number | Name | Date |
|---|---|---|
| 2,389,576 | Kosolapoff | Nov. 20, 1945 |
| 2,439,214 | Lindsey | Apr. 6, 1948 |
| 2,460,043 | Teeters | Jan. 25, 1949 |

OTHER REFERENCES

Beilstein: Handbuch der Org. Chemie, vol. 4, supp. I (1929), p. 573; vol. 4, supp. II (1942), pp. 976–977.